March 17, 1959
D. R. SCOTT ET AL
2,877,657
DRIVE MECHANISM
Filed Jan. 18, 1956
3 Sheets-Sheet 1
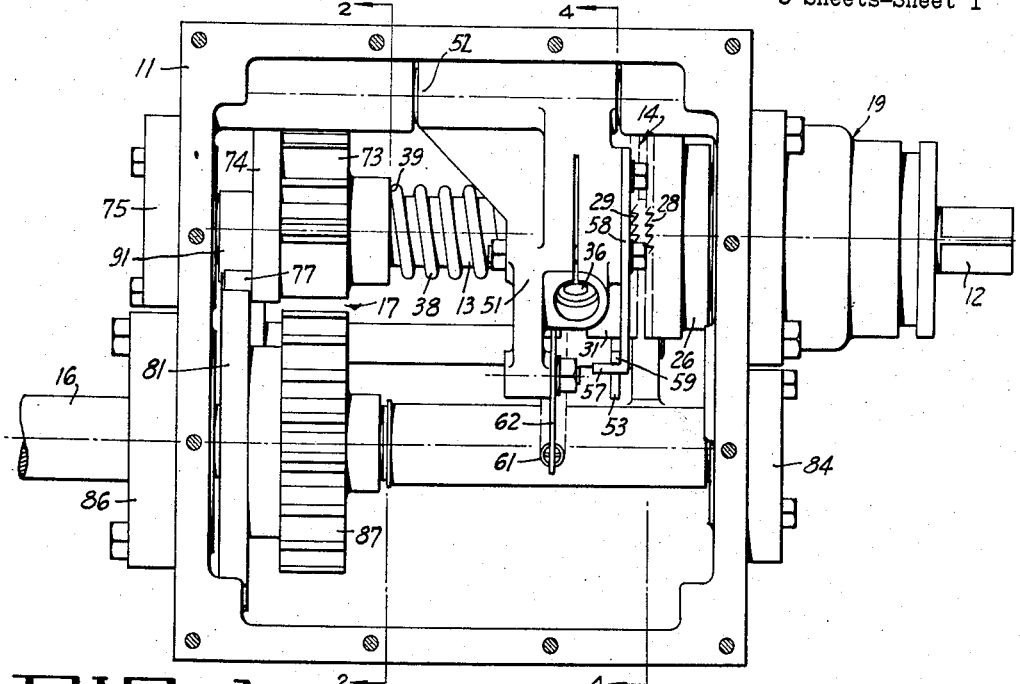
FIG_1_
FIG_2_
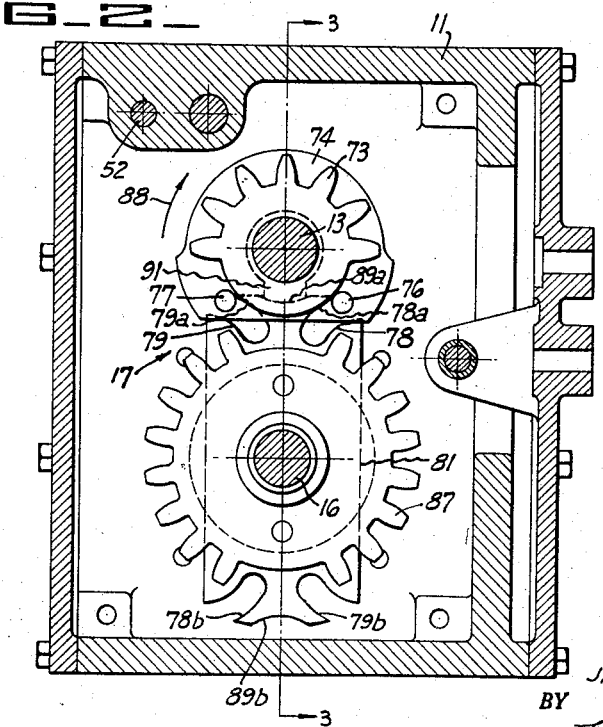
INVENTORS
DAVID R. SCOTT
JAMES A. CHESEBROUGH
HAROLD F. ELLIOTT
BY
ATTORNEYS

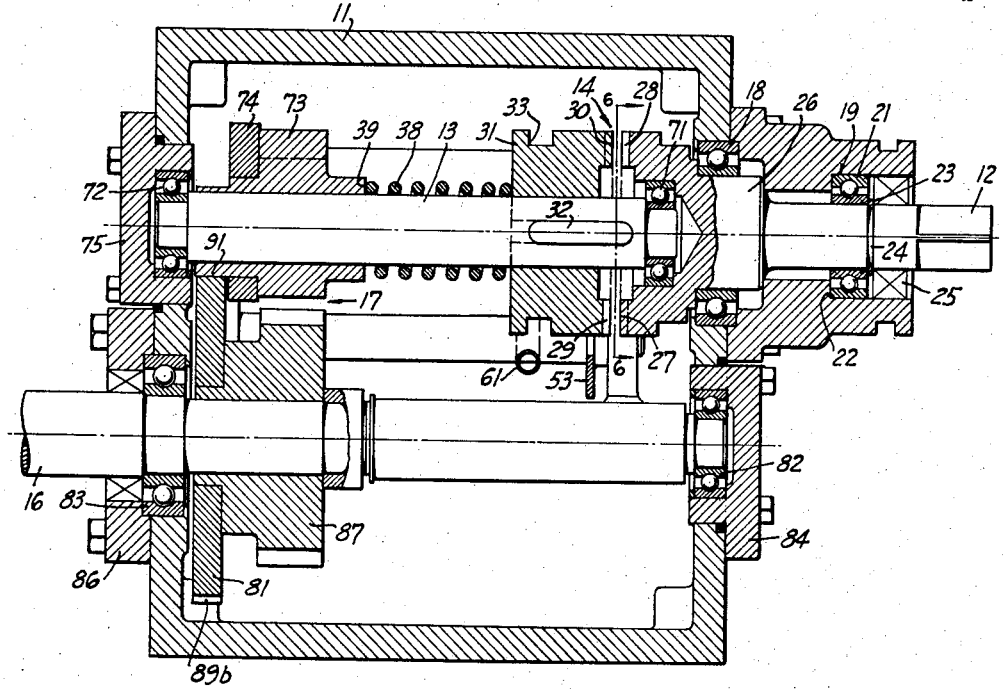
FIG_3_
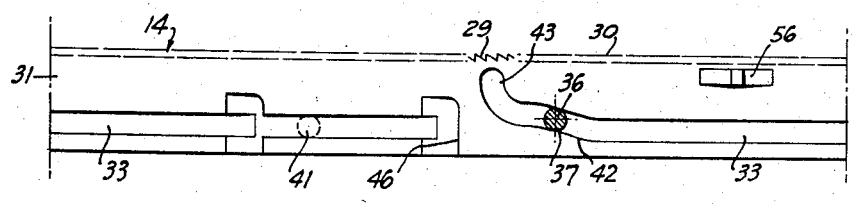
FIG_5_
FIG_6_
INVENTORS
DAVID R. SCOTT
JAMES A. CHESEBROUGH
BY HAROLD F. ELLIOTT
ATTORNEYS March 17, 1959
D. R. SCOTT ET AL
2,877,657
DRIVE MECHANISM
Filed Jan. 18, 1956
3 Sheets-Sheet 3
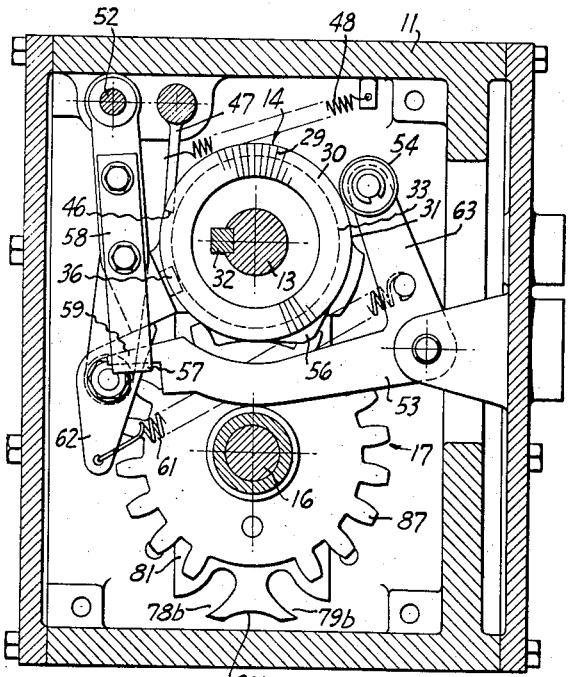
FIG_4_
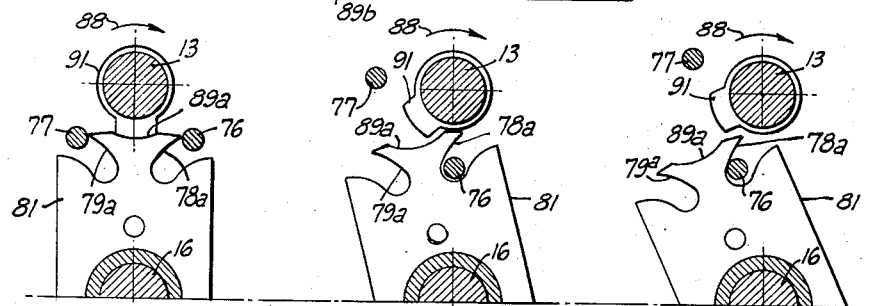
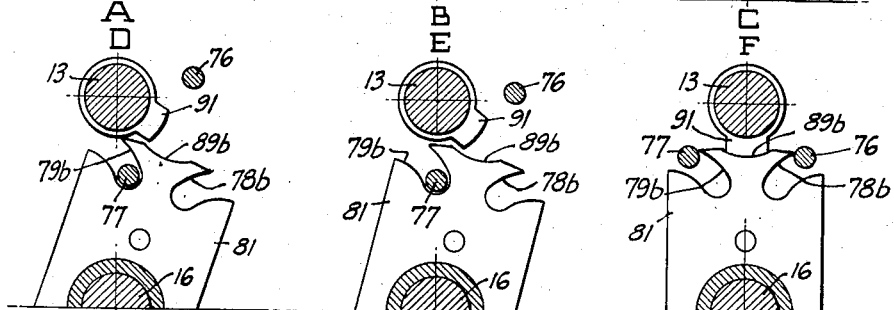
FIG_7_
INVENTORS
DAVID R. SCOTT
JAMES A. CHESEBROUGH
BY    HAROLD F. ELLIOTT
ATTORNEYS

United States Patent Office 2,877,657
Patented Mar. 17, 1959

2,877,657
DRIVE MECHANISM

David R. Scott, Palo Alto, James A. Chesebrough, Los Altos, and Harold F. Elliott, Menlo Park, Calif., assignors, by mesne assignments, to Hewlett-Packard Company, Palo Alto, Calif., a corporation of California Application January 18, 1956, Serial No. 559,937

6 Claims. (Cl. 74—393)

This invention relates generally to a drive mechanism and more particularly to a drive mechanism of the type which is adapted for cyclic operation of a driven element.

In the co-pending application filed simultaneously herewith and entitled "Agricultural Machine," there is described an improved agricultural machine which is capable of selectively operating on a row of plants to perform various operations, such as thinning, weeding or cultivating. A tractor serves to carry a plurality of generally horizontal shafts which are provided with ground engaging means. The ground engaging means are driven by a drive mechanism which is controlled by photoelectric means. The photoelectric means is associated with an electrical system which operates a clutch. A suitable photoelectric system is described in co-pending application filed simultaneously herewith and entitled "Photoelectric System."

In an agricultural machine of the type described, it is desirable that the cutting means be accurately positioned at the end of each cycle of operation so that they may operate accurately during the succeeding cycle. It is also desirable that when the drive mechanism is engaged in response to light responses from a plant that the ground engaging means be accelerated from a stop to full cutting speed over a small angular displacement to avoid shock to the associated parts. It is also desirable to provide a period of deceleration at the end of the cutting cycle whereby the cutting means may be stopped with a minimum of shock to the associated parts.

A drive mechanism which is adapted to cyclic operation and in which shock to associated parts is at a minimum is also desirable in assembly lines, packaging machines, and the like types of machinery.

It is an object of the present invention to provide an improved drive mechanism.

It is a further object of the present invention to provide an improved drive means in which shock during starting and stopping is considerably reduced.

It is another object of the present invention to provide an improved clutch.

It is still a further object of the present invention to provide a clutch in which the driving and driven member engage for conjoint rotation.

It is still another object of the present invention to provide a drive mechanism for cyclically operating associated equipment and in which the shock to associated equipment is considerably reduced.

These and other objects of the present invention will be more apparent from the following description read in conjunction with the accompanying drawing.

Referring to the drawing:

Figure 1 is a side elevational view of the drive mechanism with the front cover removed;

Figure 2 is a sectional view taken along the line 2—2 of Figure 1 and showing the drive means;

Figure 3 is a sectional view taken along the line 3—3 of Figure 2;

Figure 4 is a sectional view taken along the line 4—4 of Figure 1;

Figure 5 is a laid out plan view of the clutch driven member showing the contour of the operating cam;

Figure 6 is a view taken along the line 6—6 of Figure 3; and

Figure 7 shows the operation of the drive means during commencement and termination of a rotative cycle.

The operating parts are mounted within the box or housing 11. The power shaft 12 extends through and is suitably journalled to one end of the housing. A driving shaft 13 has its axis coincident with that of the power shaft 12. Interposed between the power shaft 12 and the driving shaft 13 is a suitable clutch designated generally by the reference numeral 14. The driven shaft 13 extends through and is journalled to the other end of the housing. The driven shaft 16 serves to drive associated equipment. Suitable drive means designated generally by the reference numeral 17 are interposed between the shafts 13 and 16 and serve to drive the shaft 16.

The wall of the housing 11 is provided with a suitable bearing 18 for the power shaft 12 (Figure 3). A second bearing 21 for the power shaft is carried by the structure 19. Suitable means are employed to hold the bearing 21 against the shoulder 22. For example, the snap-in washer 23 may be adapted to fit into the accommodating groove 24 and hold the bearing 21 in position. A suitable seal 25 occupies the space in the housing to the rear of the bearing.

The clutch 14 is of novel construction. The clutch drive member 26 is suitably attached to the power shaft 12, as for example, by welding. It is, of course, apparent that the drive member and shaft may be formed as a unitary structure. The end face 27 of the driving member 26 is provided with a plurality of teeth 28 which are adapted to engage mating teeth 29 formed on the face 30 of the driven member 31. When the clutch is engaged, the teeth mate whereby the members rotate conjointly without any slippage. The driven member 31 is suitably mounted to drive the shaft 13. The member 31 is mounted for slidable movement in an axial direction with respect to the shaft 13. For example, the member 31 may be keyed 32 to the shaft, or a suitable spline connection may be made. The axial movement of the driven member with respect to the shaft permits engagement or disengagement of the teeth 28 and 29 formed on the driving and driven members, respectively. When the members are engaged, they rotate conjointly and power is transmitted directly from the power shaft 12 to the driving shaft 13.

The drive means designated generally by the reference numeral 17 is adapted to transmit power from a driving shaft, in this instance shaft 13, to a driven shaft. Referring to the figures, the drive means is shown connected to transmit power from the driving shaft 13 to the driven shaft 16. One end of the driving shaft 13 is carried by the bearing 71 which is seated within the drive member 26. The other end of the shaft 13 is journalled on the bearing 72 which is carried by the wall of the housing 11. A suitable seal 75 is provided to seal the housing.

An interrupted gear 73 and a plate 74 are mounted on the shaft 13. The pins 76, 77 are adapted to engage the associated cams 78 and 79, respectively. The cams are formed on the plate 81 which is suitably attached to the driven shaft 16. The shaft 16 is journalled on the front and rear walls of the housing 11. Thus, the bearing 82 is mounted on one wall while the bearing 83 is mounted on the other wall. Suitable seals 84 and 86 provide a seal. A gear 87 adapted to engage the interrupted gear 73 is mounted on the shaft 16 adjacent the plate 81.

Operation of the drive means is as follows: Assuming that a cyclic clutch of the type in which one cycle of operation turns the shaft 13 through one revolution is employed. A suitable clutch has been described above. When the shaft 13 turns through one revolution, the interrupted gear 73 and plate 74 are also turned through one revolution. Assuming the direction of rotation shown by the arrow 88, (Figure 7), the pin 76 will engage the cam surface 78a to turn the plate 81 (Figure 7A). The cam is so contoured that the pin 76 slowly accelerates the gear 87 and shaft 16 from standstill to its maximum velocity when the center of the pin is on the line connecting the centers of the shafts 13 and 16 (Figure 7B). The pin then rides free as shown in Figure 7C. At maximum velocity the gears are rotating with the same peripheral velocity. By forming a cam having a predetermined length the acceleration may take place over any predetermined angle of rotation. It has been found that a 17° acceleration angle is sufficient to bring the shaft to full speed without strain or shock on the associated parts and equipment. When the shaft 13 has been rotated through the predetermined angle, the interrupted gear 73 engages the gear 87 and the shaft 16 is turned at a velocity which depends on the velocity of the shaft 13 until the pin 77 engages the cam 79b. The cam is engaged in the position shown in Figure 7E. At this point the gears are disengaged and the pin acts along the cam 79b to decelerate the shaft 16. This deceleration may be carried out through a similar angle of rotation, for example 17°. When the shafts have been turned through the prescribed angle, the pin 77 rides out of the cam. In the example just described in conjunction with the drawings, the driving shaft 13 has turned through one complete revolution while the driven shaft 16 has turned through 180°. It is, of course, to be understood, that by properly choosing the gear ratio, any angle of rotation of the shaft 16 for a cycle of operation of the clutch may be attained. Means are provided for locking the shaft 16 against rotation upon completion of a rotative cycle. When the shaft 16 has come to rest, the surface 89b, formed on the ends of the plate 81, rides into engagement with the mating surface 91, carried by the shaft 13. Due to the difference in the radii of the two surfaces from their respective axes of rotation, the shaft 16 is locked to prevent rotation thereof until the clutch is again engaged for the next cycle of operation. Thus the surfaces 89a and 89b serve to lock the shaft 16 in a predetermined position between cycles of operation.

Suitable means are provided for releasably holding the driven member in its disengaged position. The driven member 31 has a cam groove 33 formed on its peripheral surface. In Figure 5, the cam groove is shown in a laid out plan view to show the contour over 360° of surface of the driven member 31. A cam follower 36 (Figure 4) is adapted to ride in the groove. Referring to Figure 5, the cam follower 36 is in the approximate position 37 when the clutch is disengaged and in readiness to begin a cycle of operation. When in this position, the cam follower releasably holds the driven member against the force of the spring 38. The spring 38 is mounted between the driven member 31 and the shoulder 39. When the cam follower is disengaged, the spring 38 urges the member 31 toward the member 26 whereby the teeth 28 and 29 are engaged. The members then rotate conjointly. After the driven member has rotated through a predetermined angle, the cam follower is allowed to drop back into the groove 33. The follower drops back into the groove 33 in the approximate position shown by the reference numeral 41. In this position the cam follower merely rides in the groove and does not urge the driven member 31 axially in either direction since the positions of the follower and groove are axially identical.

When the driven member 31 has rotated through an angle of about 355°, the cam follower begins to ride on the cam surface 42. The driven member 31 is then cammed axially to disengage the teeth. The teeth are completely out of engagement when the driven member has rotated to bring the follower to the position 37. Due to the inertia of the associated parts, the driven member will rotate through more than a complete revolution (360°). The cam follower will ride along the cam up to the approximate position indicated by the reference numeral 43 where the cam extends axially. As the cam rides along the surface, the spring 38 is compressed. Thus, there is a transfer of kinetic energy of translation into potential energy of the spring. When the driven member stops, the spring urges the member 31 axially toward the member 26 until the cam follower rides back to the position designated generally by the reference numeral 37. The member 31 is locked in this position by a latch, to be presently described, and the driving member 26 is free to rotate until the cam follower 36 is urged out of the cam groove at which time the clutch undergoes another cycle of operation.

To prevent the spring from urging the member 31 back into engagement with the member 26, the stop groove 46 is formed on the surface of the driven member. The arm 47 may be suitably pivoted on the housing 11 and is adapted to engage the groove and prevent further backward rotation of the driven member 31. The spring 48 urges the arm 47 into the lock position.

Any suitable means may be employed for moving the cam follower 36 out of the cam groove 33 and to drop it back into the cam groove after a predetermined angle of rotation of the driven member 31. For example, the cam follower may be mounted on the armature of a solenoid whereby when the solenoid is energized it is withdrawn. A suitable lever assembly may also be employed. One particular construction of a suitable lever assembly is shown. The follower or pin 36 is carried on a member 51 which is pivoted at 52 on the housing. The arm 51 may be engaged by any suitable trip mechanism, for example, the arm may be engaged by electromagnetic means which serves to draw the arm outwardly to disengage the follower in response to an electrical signal. The arm may also carry a suitable roller which is engaged by a trip drive which serves to move the arm outwardly. Any such means for urging the arm are within the scope of this invention.

Suitable means are provided to prevent the cam follower 36 from dropping back for a predetermined angle of rotation of the driven member 31, i. e., for the follower to lie opposite the approximate position 41. For example, a latching arm 53 carries a roller 54 adapted to ride upon the member 31 at one end thereof. The surface of the member 31 is provided with a cam 56 which engages the roller 54 after a predetermined angle of rotation of the member 31. The portion 57 of the lock-out latch arm 58 engages the portion 59 of the arm 53 and serves to lock the arm 51 whereby the cam follower may not drop back into the groove until the arm 53 is actuated by the cam 56. When the driven member has rotated through a predetermined angle, the cam 56 engages the roller 54 to rotate the arm 53 and unlatch the arm 51 to allow the cam follower to drop back into the cam groove. The spring 61 is mounted between the extension 62 of the arm 51 and the leg 63 of the latching arm 53. This spring serves a dual purpose of urging the roller 54 into engagement with the surface of the member 31 and to urge the cam follower 36 into engagement with the cam groove.

A cycle of operation of the clutch is as follows: In its position of readiness, the cam follower 36 engages the cam 33 formed on the member 31 and is in the approximate position as shown at 37. When the arm 51 is actuated by external means such as electromagnetic or cam means, the cam follower is retracted from the groove 33. The member 31 is then urged axially into engagement with the member 26 by the spring 38. The end faces of the members 26 and 31 have mating teeth formed thereon, as previously described, and these teeth engage for conjoint rotation. Thus the driving shaft 13 is positively driven by the power shaft 12.

The latching arm 53 locks the arm 51 for a predetermined angle of rotation whereby the cam follower 36 may not engage the cam groove. The cam 56 then engages the roller 54 and the latching mechanism is released whereby the cam follower 36 drops back into the cam groove to ride therein. After the member 31 has rotated through about 355°, the follower 36 begins to ride on the cam surface 42. This urges the driven member 31 of the clutch in an axial direction and out of engagement with the member 26. The kinetic energy stored in the various moving parts is expended in compressing the spring 38 as the follower 36 rides in the axially extending portion 43 of the groove 33. After the kinetic energy is absorbed by the spring 38 and the member 31 and shaft 13 come to a stop, the spring urges the member 31 axially in such a manner that the follower 36 develops a force which rotates the member 31 in a reverse direction until the arm 47 engages the slot 46. The cycle of operation is then completed and the clutch is in readiness for the next cycle of operation.

It is apparent that the clutch described may be used in conjunction with power shafts and driven shafts for cyclically transmitting energy from a continuously rotating power shaft to associated equipment. The invention is not to be limited to the specific type of drive mechanism described and illustrated in conjunction with the clutch, but it should be realized that the clutch has other uses aside and apart from those shown and described in this application.

A complete cycle of operation of the apparatus is then as follows: The clutch is engaged whereby the shaft 13 is turned through one cycle of revolution. The pins then engage the associated cams to accelerate the shaft 16 during commencement of a rotative cycle. After a predetermined angular movement, the interrupted gear 73 engages the gear 87 and the shaft 16 is positively driven. As the shaft 16 reaches completion of its rotative cycle, the pin 77 engages the cam 79b and the gears are disengaged. The shaft 16 is decelerated. The shaft 16 comes to a stop as the cam follower engages the cam to disengage the gears formed on the face of the members 26 and 31. The shaft 13 then continues to rotate a short distance compressing the spring and then goes back to its position of rest. The surface 89b of the plate 81 engages the surface 91 carried by the shaft 13 and the shaft 16 is locked.

Although the mechanism has been described with respect to a clutch which goes through a full revolution and a driven member which goes through half of a revolution for one cycle of operation, it is apparent that the clutch may be so designed that a complete cycle of operation thereof may comprise any angle, for example, an angle of 180°. Likewise, the gear ratio of the gears 73 and 87 may be so chosen that the shaft 16 turns one full revolution for a full revolution of the shaft 13. On the other hand, the gears may be so designed whereby the shaft 16 turns through any predetermined angle with a full revolution or partial revolution of the shaft 13. All of these variations are apparent and are within the spirit and scope of this invention.

Thus it is seen that we have provided a clutch which is positively engaged and in which means are provided for absorbing the energy when the clutch comes to a stop. Further, a novel drive is provided which serves to accelerate the associated parts prior to driving them at a constant angular velocity and which serve to decelerate the parts at the end of a cycle of operation. This prevents excessive shock to the associated equipment and to the parts of the drive mechanism. The combination of the clutch and drive means provides a drive mechanism which operates cyclically to drive associated equipment.

We claim:

1. In a cyclic clutch adapted to operatively connect a first continuously rotating power shaft to a second shaft adapted to be cyclically rotated, first and second members adapted to be engaged for conjoint rotation, said first member being attached to the first shaft, said second member being connected to the second shaft to rotate the same and adapted for axial sliding movement relative thereto, yieldable means for urging said second member towards said first member and towards the engaged position, means releaseably engaging the second member for retaining the same in a disengaged position, and means whereby rotational over-travel of said second member causes axial movement of said second member against the urge of said yieldable member.

2. Apparatus as in claim 1 wherein said means for releasably engaging said second member comprises a peripheral groove formed thereon, and moveable pin means adapted to engage said groove.

3. Apparatus as in claim 2 together with means for locking said moveable pin in a disengaged position for a predetermined angular rotation.

4. Apparatus as in claim 3 together with means for retracting said pin, means for locking said pin in retracted position for a predetermined angular rotation, and means for automatically releasing said pin whereby it re-engages the peripheral groove.

5. In a cyclic clutch adapted to operatively connect a first continuously rotating power shaft to a second saft adapted to be cyclically rotated, first and second members adapted to be engaged for conjoint rotation, said first member being attached to the first shaft, said second member being connected to the second shaft to rotate the same and adapted for axial sliding movement relative thereto, yieldable means for urging said second member towards the first member and towards the engaged position, a peripheral groove formed on said second member and having an end portion extending in an axial direction, a pin serving to releaseably engage said peripheral groove for disengaging and retaining the second member in a disengaged position, and means for retracting said pin for a predetermined angle of rotation whereby said members are engaged for conjoint rotation.

6. Apparatus as in claim 5 wherein said end portion of said groove has an axially extended portion which serves to transfer the momentum of the moving parts to the yieldable means.

References Cited in the file of this patent

UNITED STATES PATENTS

| | | |
|---|---|---|
| 1,193,008 | Fuller | Aug. 1, 1916 |
| 1,670,648 | Beyer | May 22, 1928 |
| 2,271,359 | Zeruneith | Jan. 27, 1942 |
| 2,395,803 | Bruckner | Mar. 5, 1946 |
| 2,656,731 | Wildhaber | Oct. 27, 1953 |
| 2,717,676 | Johnson | Sept. 13, 1955 |
| 2,816,459 | Badlam | Dec. 17, 1957 |

FOREIGN PATENTS

| | | |
|---|---|---|
| 405,149 | Great Britain | Feb. 1, 1934 |